United States Patent
Ando et al.

(10) Patent No.: US 12,234,323 B2
(45) Date of Patent: Feb. 25, 2025

(54) TRANSPARENT POLYIMIDE FILM AND PRODUCTION METHOD THEREFOR

(71) Applicant: Kaneka Corporation, Osaka (JP)

(72) Inventors: Takashi Ando, Settsu (JP); Kohei Ogawa, Settsu (JP); Masahiro Miyamoto, Settsu (JP)

(73) Assignee: Kaneka Corporation (JP)

( * ) Notice: Subject to any disclaimer, the term of this patent is extended or adjusted under 35 U.S.C. 154(b) by 422 days.

(21) Appl. No.: 17/622,424

(22) PCT Filed: Jun. 22, 2020

(86) PCT No.: PCT/JP2020/024386
§ 371 (c)(1),
(2) Date: Dec. 23, 2021

(87) PCT Pub. No.: WO2020/262295
PCT Pub. Date: Dec. 30, 2020

(65) Prior Publication Data
US 2022/0411584 A1    Dec. 29, 2022

(30) Foreign Application Priority Data
Jun. 24, 2019   (JP) ................................ 2019-116415

(51) Int. Cl.
C08G 73/10   (2006.01)
C08G 73/16   (2006.01)
C08J 5/18    (2006.01)
C08K 5/521   (2006.01)

(52) U.S. Cl.
CPC ......... *C08G 73/10* (2013.01); *C08G 73/1042* (2013.01); *C08G 73/1064* (2013.01); *C08G 73/1067* (2013.01); *C08G 73/16* (2013.01); *C08J 5/18* (2013.01); *C08K 5/521* (2013.01); *C08J 2379/08* (2013.01)

(58) Field of Classification Search
CPC .......................... C08G 73/10; C08G 73/1042; C08G 73/1064; C08G 73/1067; C08G 73/16; C08G 73/1039; C08J 5/18; C08J 2379/08; C08K 5/521; C08K 5/523; C08L 79/08
See application file for complete search history.

(56) References Cited

U.S. PATENT DOCUMENTS

| | | | |
|---|---|---|---|
| 2004/0235992 A1 | 11/2004 | Okada et al. | |
| 2014/0127497 A1* | 5/2014 | Nakayama | C09D 179/08 428/335 |
| 2019/0153158 A1 | 5/2019 | Kondo et al. | |
| 2022/0112209 A1* | 4/2022 | Komatsu | C08G 73/1007 |

FOREIGN PATENT DOCUMENTS

| | | |
|---|---|---|
| CN | 1522387 A | 8/2004 |
| CN | 1654518 A | 8/2005 |
| CN | 104744938 A | 7/2015 |
| JP | 2007108761 A | 4/2007 |
| JP | 2012041473 A * | 3/2012 |
| JP | 2012144603 A | 8/2012 |
| JP | 2013095894 A | 5/2013 |
| JP | 2016062965 A | 4/2016 |
| JP | 2016132686 A | 7/2016 |
| JP | 2017137443 A | 8/2017 |
| JP | 2017186473 A | 10/2017 |
| WO | 2014041816 A1 | 3/2014 |
| WO | 2017175869 A1 | 10/2017 |

OTHER PUBLICATIONS

"Flame Retardants" ADEKA Corporation. https://www.adeka.co.jp/en/chemical/products/plastic/pro119c.html. Accessed Apr. 11, 2024 (Year: 2024).*
Ming-hu, et al. "Study on Improvement of Tensile Strength of Polyimide Film", Journal of Xia men University (Natural Science ), vol. 44, No. 2 (Mar. 2005) . 4 pgs.
International Preliminary Report including written opinion for Application No. PCT/JP2020/024386 mailed Jan. 6, 2022, pp. 1-6.
International Search Report for PCTJP2020024386 dated Sep. 8, 2020, 2 pgs.

* cited by examiner

*Primary Examiner* — John D Freeman
(74) *Attorney, Agent, or Firm* — Lerner David LLP

(57) ABSTRACT

The present invention relates to a transparent polyimide film containing a polyimide and a phosphate ester. The content of the phosphate ester based on 100 parts by mass of the polyimide is 3 parts by mass or more, preferably 5 to 100 parts by mass. It is preferable to use a phosphate ester that has a high birefringence reduction effect and with which a decrease in the tensile modulus of the film is small. In production of the polyimide film, it is preferable to employ a method in which: a solvent-soluble polyimide resin and a phosphate ester are dissolved in an organic solvent exhibiting solubility with respect to the polyimide resin to prepare a polyimide solution; the polyimide solution is applied onto a substrate; and the organic solvent is removed.

10 Claims, No Drawings

TRANSPARENT POLYIMIDE FILM AND PRODUCTION METHOD THEREFOR

CROSS-REFERENCE TO RELATED APPLICATIONS

This application is a national phase entry under 35 U.S.C. § 371 of PCT/JP2020/024386 filed Jun. 22, 2020, which claims the benefit of priority to Japanese Patent Application No. 2019-116415 filed on Jun. 24, 2019, the disclosures of which are hereby incorporated by reference herein its entirety.

TECHNICAL FIELD

The present invention relates to a transparent polyimide film and a production method therefor.

BACKGROUND ART

Recently, with rapid progress of electronic devices, it has been required to make devices thinner, lighter and flexible. In particular, in applications where high heat resistance, dimensional stability at high temperatures and high mechanical strength are required, an attempt has been made to apply a polyimide film as a replacement for glass which is used for substrates, cover windows and the like.

Common polyimides are colored yellow or brown, and are not soluble in organic solvents. For forming a polyimide, which is insoluble in an organic solvent, into a film, a method has been employed in which a polyamic acid solution as a polyimide precursor is applied onto a substrate, the solvent is removed by heating, and the polyamic acid is cyclodehydrated (thermal imidization). In contrast, Patent Document 1 to 3 indicate that transparency to visible light and solubility can be imparted to a polyimide by introducing a cycloaliphatic structure, a bent structure, a fluorine substituent or the like.

PRIOR ART DOCUMENTS

Patent Documents

Patent Document 1: Japanese Patent Laid-Open No. 2012-144603
Patent Document 2: Japanese Patent Laid-Open No. 2016-132686
Patent Document 3: International Publication No. WO 2017/175869

SUMMARY OF THE INVENTION

Problems to be Solved by the Invention

Since the polyimide resins described in Patent Documents 1 to 3 is soluble in an organic solvent, a transparent polyimide film can be produced from a polyimide solution obtained by dissolving the polyimide resin in an organic solvent. A film produced by solution casting method generally has small birefringence, but the polyimide molecules are easily oriented in-plane direction of a film so that the thickness-direction retardation Rth is likely to increase. In a film having a large Rth, rainbow-like unevenness or a shift in color tone, which is due to the influence of birefringence, is easily observed at the time of viewing in an oblique direction, and such a film may cause deterioration of visibility when used as a display material such as a cover film.

As a method for reducing the birefringence of a resin film, a method is known in which a retardation adjusting agent is added. The retardation adjusting agent generally acts like a plasticizer, and has an action of reducing birefringence by relaxing the orientation of molecules. When a retardation adjusting agent acting like a plasticizer is used, the film tends to have reduced birefringence and reduced mechanical strength.

A member, such as a cover film, that is arranged on an outermost surface of a display is required to have low birefringence and high mechanical strength. When birefringence is reduced by an additive acting like a plasticizer, an optical problem can be solved, but mechanical strength tends to be insufficient. In other words, there is generally a trade-off relationship between low birefringence and high mechanical strength. In view of these situations, an object of the present invention is to provide a transparent polyimide film having low birefringence and sufficient mechanical strength.

Means for Solving the Problems

The present inventors have conducted studies, and resultantly found that when a phosphoric ester is added, it is possible to reduce the birefringence while suppressing a decrease in the tensile elastic modulus of a polyimide film.

One embodiment of the present invention is a transparent polyimide film containing a polyimide and a phosphoric ester. The polyimide film is obtained by, for example, preparing a polyimide solution by dissolving a solvent-soluble polyimide resin and a phosphoric ester in an organic solvent in which the polyimide resin is soluble, applying the polyimide solution onto a substrate, and removing the organic solvent.

The polyimide is a polymer containing a repeating unit represented by general formula (1).

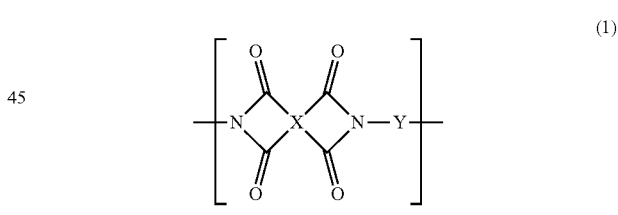

(1)

In general formula (1), X is any tetravalent organic group, which is an acid dianhydride residue. Y is any divalent organic group, which is a diamine residue. The organic group X is preferably one containing a fluoroalkyl group, an ether bond, a thioether bond, an ester bond, a sulfone group, an alicyclic structure, or a linear aliphatic group having 2 or more carbon atoms. The organic group Y is preferably one containing a fluoroalkyl group, a sulfone group, a fluorene structure or an alicyclic structure.

The content of the phosphoric ester in the polyimide film is 3 parts by mass or more, preferably 5 to 100 parts by mass, more preferably 15 to 100 parts by mass based on 100 parts by mass of the polyimide.

Examples of the phosphoric ester include an orthophosphoric ester represented by general formula (2) and a condensed phosphoric ester represented by general formula (3).

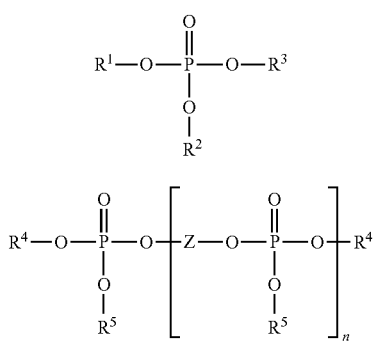

(2)

(3)

$R^1$ to $R^3$ in general formula (2) and $R^4$ and $R^5$ in genera formula (3) are each independently any substituent. Specific examples of $R^1$ to $R^5$ include aryl groups optionally having a substituent, aliphatic groups having 1 to 20 carbons and optionally having a branch, and poly(oxyalkylene)alkyl groups. Among them, $R^1$ to $R^5$ are each preferably an aryl group optionally having a substituent.

In general formula (3), n is an integer of 1 or more, and Z is a divalent organic group containing at least one aromatic ring. Examples of the divalent organic group Z include the following groups Z-1 to Z-6.

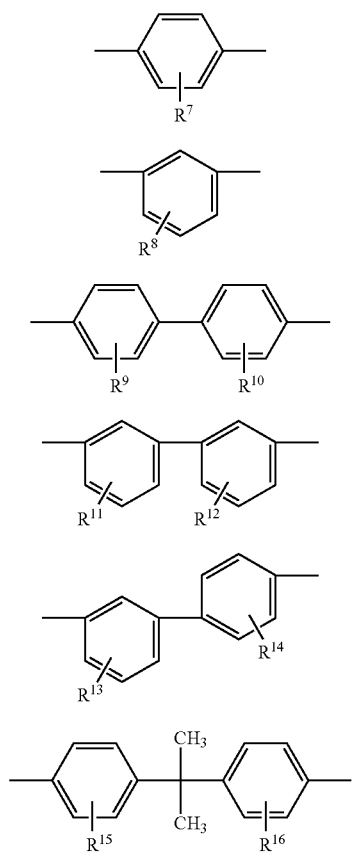

Z-1

Z-2

Z-3

Z-4

Z-5

Z-6

$R^7$ to $R^{16}$ are each independently a hydrogen atom or an alkyl group having 1 to 6 carbon atoms and optionally having a branch, where two or more $R^7$ to $R^{16}$ may be bonded to each benzene ring of Z-1 to Z-6.

Specific examples of the orthophosphoric ester include triphenyl phosphate, tricresyl phosphate and cresyldiphenyl phosphate. Specific examples of the condensed phosphoric ester include resorcinol bis(diphenyl phosphate), bisphenol A bis(diphenyl phosphate) and resorcinol bis(di-2,6-xylenyl phosphate).

The ratio E/E' between the tensile elastic modulus (E) of a polyimide film containing a phosphoric ester and the tensile elastic modulus (E') of a polyimide film, which is free of a phosphoric ester, is preferably 0.80 or more, more preferably 0.90 or more. The ratio Δn/Δn' between the thickness-direction birefringence (Δn) of a polyimide film containing a phosphoric ester and the thickness-direction birefringence (Δn') of a polyimide film, which is free of a phosphoric ester, is preferably less than 0.90, more preferably less than 0.80. The thickness-direction birefringence (Δn) of the polyimide film is preferably 0.050 or less.

Effects of the Invention

According to the present invention, it is possible to provide a transparent polyimide film in which birefringence is reduced without reducing mechanical strength.

MODE FOR CARRYING OUT THE INVENTION

One embodiment of the present invention is a transparent polyimide film containing polyimide and a phosphoric ester.
[Polyimide]
The polyimide has a repeating unit of the following general formula (1).

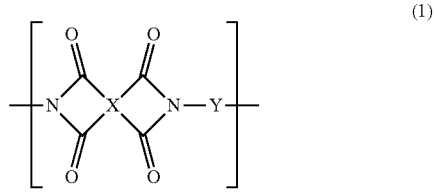

(1)

In general, a polyimide is obtained by cyclodehydration of a polyamic acid obtained by reacting a tetracarboxylic acid dianhydride of the following formula (A) (hereinafter, sometimes referred to simply as an "acid dianhydride") with a diamine of the following formula (B). In other words, the polyimide has an acid dianhydride-derived structure and a diamine-derived structure.

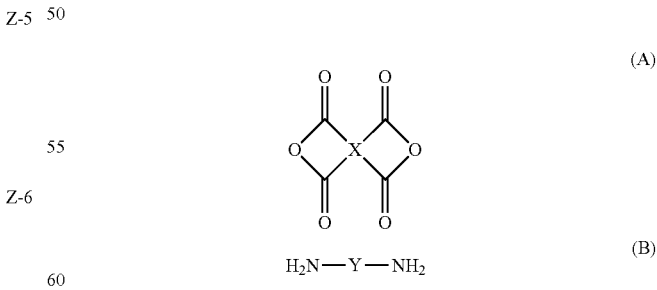

(A)

(B)

In general formula (1), X is a residue of a tetracarboxylic dianhydride. The residue of a tetracarboxylic dianhydride is a moiety other than the two acid anhydride groups (—CO—O—CO—) in the compound of general formula (A) (tetracarboxylic dianhydride), and is a tetravalent organic group. In the tetracarboxylic dianhydride, every two of four carbonyl groups bonded to X are paired, and form a five-membered ring with X and an oxygen atom. In general formula (1), Y is a residue of a diamine. The residue of a diamine is a moiety other than two amino groups (—NH₂) in the compound the general formula (B), and is a divalent organic group.

(Acid Dianhydrides)

Examples of acid dianhydrides as raw material of the transparent polyimide include ethylenetetracarboxylic acid dianhydride, butanetetracarboxylic acid dianhydride, 1,2,3,4-cyclobutanetetracarboxylic acid dianhydride, 1,2,3,4-cyclopentanetetracarboxylic acid dianhydride, 1,2,4,5-cyclohexanetetracarboxylic acid dianhydride, 1,1'-bicyclohexane-3,3',4,4'-tetracarboxylic acid dianhydride-3,4,3',4'-dianhydride, 3,3',4,4'-benzophenonetetracarboxylic acid dianhydride, 2,2',3,3'-benzophenonetetracarboxylic acid dianhydride, 2,2',3,3'-biphenyltetracarboxylic acid dianhydride, pyromellitic dianhydride, 3,3',4,4'-biphenyltetracarboxylic acid dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(3,4-dicarboxyphenyl)sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, and 2,2-bis{4-[4-(1,2-dicarboxyphenyl)phenoxy]phenyl}-1,1,1,3,3,3-hexafluoropropane dianhydride, 1,3-bis[(3,4-dicarboxy)benzoyl]benzene dianhydride, 1,4-bis[(3,4-dicarboxy)benzoyl]benzene dianhydride, 2,2-bis{4-[4-(1,2-dicarboxy)phenoxy]phenyl}propane dianhydride, 2,2-bis{4-[3-(1,2-dicarboxy)phenoxy]phenyl}propane dianhydride, bis{4-[4-(1,2-dicarboxy)phenoxy]phenyl}ketone dianhydride, bis{4-[3-(1,2-dicarboxy)phenoxy]phenyl}ketone dianhydride, 4,4'-bis[4-(1,2-dicarboxy)phenoxy]biphenyl dianhydride, 4,4'-bis[3-(1,2-dicarboxy)phenoxy]biphenyl dianhydride, bis{4-[4-(1,2-dicarboxy)phenoxy]phenyl}ketone dianhydride, bis{4-[3-(1,2-dicarboxy)phenoxy]phenyl}ketone dianhydride, bis{4-[4-(1,2-dicarboxy)phenoxy]phenyl}sulfone dianhydride, bis{4-[3-(1,2-dicarboxy)phenoxy]phenyl}sulfone dianhydride, bis{4-[4-(1,2-dicarboxy)phenoxy]phenyl}sulfide dianhydride, bis{4-[3-(1,2-dicarboxy)phenoxy]phenyl}sulfide dianhydride, 2,2-bis{4-[3-(1,2-dicarboxy)phenoxy]phenyl}-1,1,1,3,3,3-propane dianhydride, 2,3,6,7-naphthalenetetracarboxylic acid dianhydride, 1,4,5,8-naphthalenetetracarboxylic acid dianhydride, 1,2,5,6-naphthalenetetracarboxylic acid dianhydride, 1,2,3,4-benzenetetracarboxylic acid dianhydride, 3,4,9,10-perylenetetracarboxylic acid dianhydride, 2,3,6,7-anthracenetetracarboxylic acid dianhydride and 1,2,7,8-phenyltetracarboxylic acid dianhydride, bis(1,3-dioxo-1,3-dihydroisobenzofuran-5-carboxylic acid)1,4-phenylene, and bis(1,3-dioxo-1,3-dihydroisobenzofuran-5-carboxylic acid) 2,2',3,3',5,5'-hexamethylbiphenyl-4,4'-diyl.

The acid dianhydride as a raw material of the transparent polyimide is preferably one containing any of a fluoroalkyl group, an ether bond, a thioether bond, an ester bond, a sulfone group, an alicyclic structure, and a linear aliphatic group having 2 or more carbon atoms, as the residue X. The fluoroalkyl group is preferably a perfluoroalkyl group, particularly preferably a trifluoromethyl group.

In particular, from the viewpoint of reducing the birefringence of the polyimide film, the acid anhydride is preferably an acid dianhydride in which X is any one of the following groups X-1 to 4 or any one of the following groups X-7 to 13. From the viewpoint of improving the solubility of a polyimide resin in an organic solvent and increasing the elastic modulus of a polyimide film, the acid anhydride is preferably an acid dianhydride in which X is the following group X-5 (bis(1,3-dioxo-1,3-dihydroisobenzofuran-5-carboxylic acid)2,2',3,3',5,5'-hexamethylbiphenyl-4,4'-diyl) or an acid dianhydride in which X is the following group X-6 (bis(1,3-dioxo-1,3-dihydroisobenzofuran-5-carboxylic acid) 1,4-phenylene).

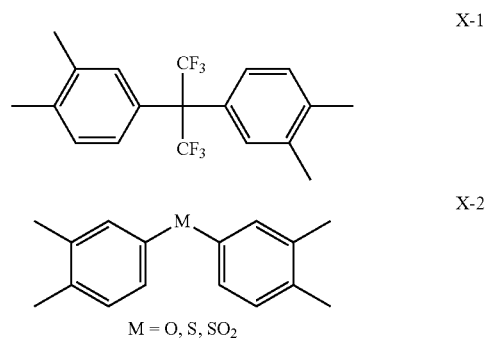

X-1

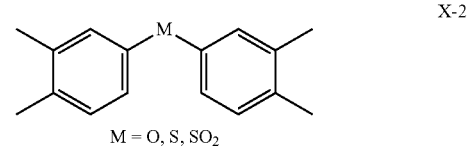

X-2

M = O, S, SO₂

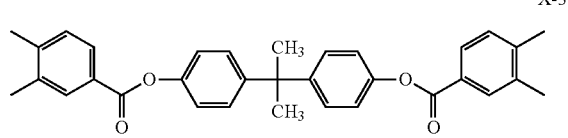

X-3

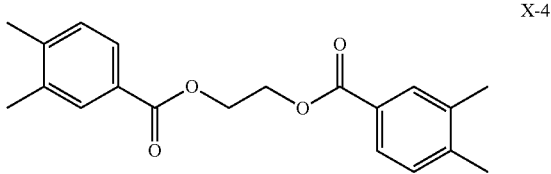

X-4

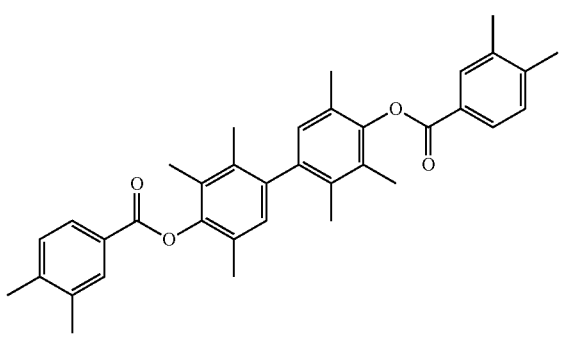

X-5

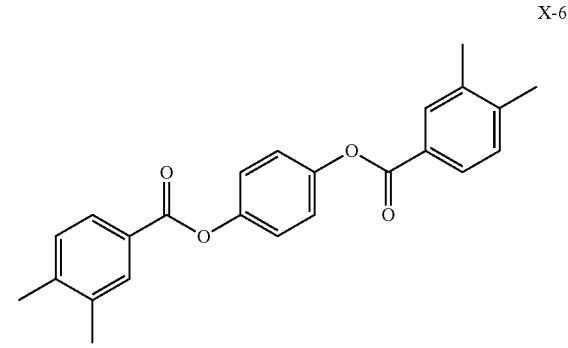

X-6

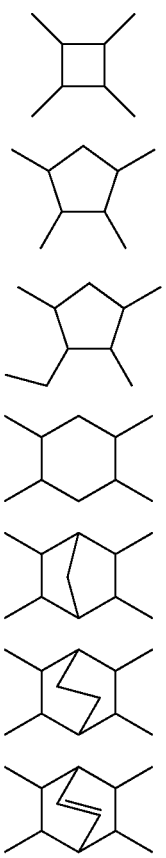

As a raw material of the polyimide, a plurality kinds of acid dianhydrides may be used in combination. In other words, the polyimide may contain a plurality kinds of acid dianhydride residues X. For example, by combined use of an acid dianhydride in which X is any one of the groups X-1 to 4 and an acid dianhydride in which X is the group X-5 or X-6, a polyimide having an excellent solubility in an organic solvent and a polyimide film having a high elastic modulus and low birefringence can be obtained. Acid dianhydrides other than those described above may be used in combination as long as solubility in an organic solvent and transparency are not impaired.

(Diamines)

Examples of diamines as raw material of the transparent polyimide include 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenylsulfone, 3,4'-diaminodiphenylsulfone, 4,4'-diaminodiphenylsulfone, bis[4-(3-aminophenoxy)phenyl]sulfide, bis[4-(4-aminophenoxy)phenyl]sulfide, 4,4'-bis[4-(4-amino-α,α-dimethylbenzyl)phenoxy]diphenylsulfone, 4,4'-bis[4-(4-aminophenoxy)phenoxy]diphenylsulfone, 3,3'-diaminobenzophenone, 4,4'-diaminobenzophenone, 3,4'-diaminobenzophenone, 3,3'-diaminodiphenylmethane, 4,4'-diaminodiphenylmethane, 3,4''-diaminodiphenylmethane, 2,2-di(3-aminophenyl)propane, 2,2-di(4-aminophenyl)propane, 2-(3-aminophenyl)-2-(4-aminophenyl)propane, 1,4-diamino-2-fluorobenzene, 1,4-diamino-2,3-difluorobenzene, 1,4-diamino-2,5-difluorobenzene, 1,4-diamino-2,6-difluorobenzene, 1,4-diamino-2,3,5-trifluorobenzene, 1,4-diamino-2,3,5,6-tetrafluorobenzene, 1,4-diamino-2-(trifluoromethyl)benzene, 1,4-diamino-2,3-bis(trifluoromethyl)benzene, 1,4-diamino-2,5-bis(trifluoromethyl)benzene, 1,4-diamino-2,6-bis(trifluoromethyl)benzene, 1,4-diamino-2,3,5-tris(trifluoromethyl)benzene, and 1,4-diamino-2,3,5,6-tetrakis(trifluoromethyl)benzene, 1,4-diamino-2-(trifluoromethyl)benzene, 1,4-diamino-2,3-bis(trifluoromethyl)benzene, 1,4-diamino-2,5-bis(trifluoromethyl)benzene, 1,4-diamino-2,6-bis(trifluoromethyl)benzene, 1,4-diamino-2,3,5-tris(trifluoromethyl)benzene, 1,4-diamino-2,3,5,6-tetrakis(trifluoromethyl)benzene, 2-fluorobenzidine, 3-fluorobenzidine, 2,3-difluorobenzidine, 2,5-difluorobenzidine, 2,6-difluorobenzidine, 2,3,5-trifluorobenzidine, 2,3,6-trifluorobenzidine, 2,3,5,6-tetrafluorobenzidine, 2,2'-difluorobenzidine, 3,3'-difluorobenzidine, 2,3'-difluorobenzidine, 2,2',3-trifluorobenzidine, 2,3,3'-trifluorobenzidine, 2,2',5-trifluorobenzidine, 2,2',6-trifluorobenzidine, 2,3',5-trifluorobenzidine, 2,3',6,-trifluorobenzidine, 2,2',3,3'-tetrafluorobenzidine, 2,2',5,5'-tetrafluorobenzidine, 2,2',6,6'-tetrafluorobenzidine, 2,2',3,3',6,6'-hexafluorobenzidine, 2,2',3,3',5,5',6,6'-octafluorobenzidine, 2-(trifluoromethyl)benzidine, 3-(trifluoromethyl)benzidine, 2,3-bis(trifluoromethyl)benzidine, 2,5-bis(trifluoromethyl)benzidine, 2,6-bis(trifluoromethyl)benzidine, 2,3,5-tris(trifluoromethyl)benzidine, 2,3,6-tris(trifluoromethyl)benzidine, 2,3,5,6-tetrakis(trifluoro)methyl)benzidine, 2,2'-bis(trifluoromethyl)benzidine, 3,3'-bis(trifluoromethyl)benzidine, 2,3'-bis(trifluoromethyl)benzidine, 2,2',3-bis(trifluoromethyl)benzidine, 2,3,3'-tris(trifluoromethyl)benzidine, 2,2',5-tris(trifluoromethyl)benzidine, 2,2',6-tris(trifluoromethyl))benzidine, 2,3',5-tris(trifluoromethyl)benzidine, 2,3',6,-tris (trifluoromethyl)benzidine, 2,2',3,3'-tetrakis(trifluoromethyl)benzidine, 2,2',5,5'-tetrakis(trifluoromethyl)benzidine, and 2,2',6,6'-tetrakis(trifluoromethyl)benzidine, 2,2-di(3-aminophenyl)-1,1,1,3,3,3-hexafluoropropane, 2,2-di(4-aminophenyl)-1,1,1,3,3,3-hexafluoropropane, 2-(3-aminophenyl)-2-(4-aminophenyl)-1,1,1,3,3,3-hexafluoropropane, 1,1-di(3-aminophenyl)-1-phenylethane, 1,1-di(4-aminophenyl)-1-phenylethane, 1-(3-aminophenyl)-1-(4-aminophenyl)-1-phenylethane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl) benzene, 1,3-bis(3-amino-α,α-ditrifluoromethylbenzyl)benzene, 1,3-bis(4-amino-α,α-ditrifluoromethylbenzyl)benzene, 1,4-bis(3-amino-α,α-ditrifluoromethylbenzyl)benzene, 1,4-bis(4-amino-α,α-ditrifluoromethylbenzyl)benzene, 2,6-bis(3-aminophenoxy)benzonitrile, 2,6-bis(3-aminophenoxy)pyridine, 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, 2,2-bis[4-(4-aminophenoxy)phenyl]-1,1,1,3,3,3-hexafluoropropane, 1,3-bis[4-(3-aminophenoxy) benzoyl]

benzene, 1,3-bis[4-(4-aminophenoxy)benzoyl]benzene, 1,4-bis[4-(3-aminophenoxy)benzoyl]benzene, 1,4-bis[4-(4-aminophenoxy)benzoyl]benzene, 1,3-bis[4-(3-aminophenoxy)-α,α-dimethylbenzyl]benzene, 1,3-bis[4-(4-aminophenoxy)-α,α-dimethylbenzyl]benzene, 1,4-bis[4-(3-aminophenoxy)-α,α-dimethylbenzyl]benzene, 1,4-bis[4-(4-aminophenoxy)-α,α-dimethylbenzyl]benzene, 4,4'-bis[4-(4-aminophenoxy)benzoyl]diphenyl ether, 4,4'-bis[4-(4-amino-α,α-dimethylbenzyl)phenoxy]benzophenone, 4,4'-bis[4-(4-amino-α,α-dimethylbenzyl)phenoxy]diphenylsulfone, 4,4'-bis[4-(4-aminophenoxy)phenoxy]diphenylsulfone, 3,3'-diamino-4,4'-diphenoxybenzophenone, 3,3'-diamino-4,4'-dibiphenoxybenzophenone, 3,3'-diamino-4-phenoxybenzophenone, 3,3'-diamino-4-phenoxybenzophenone, 6,6'-bis(3-aminophenoxy)-3,3,3',3'-tetramethyl-1,1'-spirobiindan, 6,6'-bis(4-aminophenoxy)-3,3,3',3'-tetramethyl-1,1'-spirobiindan, 1,3-bis(3-aminopropyl)tetramethyldisiloxane, 1,3-bis(4-aminobutyl)tetramethyldisiloxane, α,ω-bis(3-aminopropyl)polydimethylsiloxane, α,ω-bis(3-aminobutyl)polydimethylsiloxane, bis(aminomethyl)ether, bis(2-aminoethyl)ether, bis(3-aminopropyl)ether, bis(2-aminomethoxy)ethyl]ether, bis[2-(2-aminoethoxy)ethyl]ether, bis[2-(3-aminoprotoxy)ethyl]ether, 1,2-bis(aminomethoxy)ethane, 1,2-bis(2-aminoethoxy)ethane, 1,2-bis[2-(aminomethoxy)ethoxy]ethane, 1,2-bis[2-(2-aminoethoxy)ethoxy]ethane, ethylene glycol bis(3-aminopropyl)ether, diethylene glycol bis(3-aminopropyl)ether, triethylene glycol bis(3-aminopropyl)ether, ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,2-diaminocyclohexane, 1,3-diaminocyclohexane, 1,4-diaminocyclohexane, 1,2-di(2-aminoethyl)cyclohexane, 1,3-di(2-aminoethyl)cyclohexane, 1,4-di(2-aminoethyl)cyclohexane, bis(4-aminocyclohexyl)methane, 2,6-bis(aminomethyl)bicyclo[2.2.1]heptane, 2,5-bis(aminomethyl)bicyclo[2.2.1]heptane, 9,9'-bis(4-aminophenyl)fluorene, and 9,9'-bis(4-amino-3-fulorophenyl)fluorene.

The diamine as a raw material for the transparent polyimide is preferably one containing any of a fluoroalkyl group, a sulfone group, a fluorene structure and an alicyclic structure as the residue Y The fluoroalkyl group is preferably a perfluoroalkyl group, particularly preferably a trifluoromethyl group.

In particular, from the viewpoint of reducing the birefringence of the polyimide film, the diamine is preferably a diamine in which Y is any one of the following groups Y-1 to 5. From the viewpoint of improving the transparency and the elastic modulus of the polyimide film, the diamine is preferably a diamine in which Y is the following group Y-6 (2,2'-bis(trifluoromethyl)benzidine).

Y-1
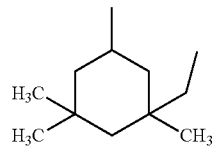

Y-2
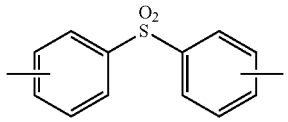

Y-3
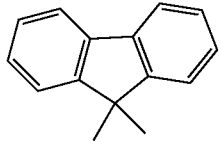

Y-4
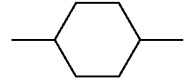

Y-5
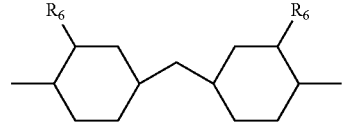

$R_6 = CH_3$ or H

Y-6
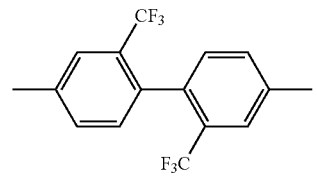

As a raw material of the polyimide, a plurality kinds of diamines may be used in combination. In other words, the polyimide may contain a plurality kinds of diamine residues Y For example, by combined use of a diamine in which Y is any one of the groups Y-1 to 5 and an acid dianhydride in which Y is the group Y-6, a polyimide excellent in solubility in an organic solvent and a polyimide film having high transparency, a high elastic modulus, and low birefringence can be obtained. Diamines other than those described above may be used in combination as long as solubility in an organic solvent and transparency are not impaired.

[Method for Production of Polyimide]

As described above, a polyimide is obtained by cyclodehydration of a polyamic acid as a polyimide precursor.

A polyamic acid solution can be obtained by reaction of an acid dianhydride and a diamine in a solvent. For example, the acid dianhydride and the diamine are dissolved in an organic solvent in substantially equimolar amounts (molar ratio of 95:100 to 105:100), and the solution is stirred until completion of the polymerization of the acid dianhydride and the diamine to obtain a polyamic acid solution. If the amount of any one of the acid dianhydride and the amine is excessive, the mechanical strength of the polyimide film may decrease because the molecular weights of the polyamic acid and the polyimide do not become sufficiently large.

In the polymerization, a method is preferable in which an acid dianhydride is added to a diamine for suppressing ring opening of the acid dianhydride. When a plurality of diamines and a plurality of acid dianhydrides are added, they may be added at one time, or may be added in a plurality of additions. By adjusting the order of adding the monomers, various physical properties of the polyimide can be controlled. The solid content concentration of the polyamic acid solution (the concentration of diamine and acid dianhydride added in the reaction solution) is typically about 5 to 35 wt %, preferably 10 to 30 wt %.

The organic solvent used for polymerization of the polyamic acid is not particularly limited as long as it does not react with a diamine and an acid dianhydride and can dissolve the polyamic acid. Examples of the organic solvent include urea-based solvents such as methylurea and N,N-dimethylethylurea; sulfoxide or sulfone-based solvents such as dimethyl sulfoxide, diphenylsulfone and tetramethyl-sulfone; amide-based solvents such as N,N-dimethyacetamide (DMAc), N,N-dimethylformamide (DMF), N,N'-diethylacetamide, N-methyl-2-pyrrolidone (NMP), γ-butyrolactone and hexamethylphosphoric triamide; alkyl halide-based solvents such as chloroform and methylene chloride; aromatic hydrocarbon-based solvents such as benzene and toluene; and ether-based solvents such as tetrahydrofuran, 1,3-dioxolane, 1,4-dioxane, dimethyl ether, diethyl ether and p-cresol methyl ether. These solvents are normally used singly, or if necessary, two or more thereof are used in combination as appropriate. From the viewpoint of the solubility and polymerization reactivity of the polyamic acid, DMAc, DMF, NMP and the like are preferable.

A polyimide can be obtained by cyclodehydration of the polyamic acid. Examples of the method for producing a polyimide film from a polyamic acid solution include a method in which a polyamic acid solution is formed into a film shape, and then imidized by heating to obtain a polyimide film; and a method in which a dehydrating agent, an imidization catalyst and the like are added to a polyamic acid solution, so that imidization is allowed to proceed in the solution, and the polyimide solution is then formed into a film shape to obtain a polyimide film. The latter method is preferable because heating at a high temperature is not required for imidization, and a polyimide film having high transparency is easily obtained.

In imidization in the solution, the polyamic acid solution may be heated to accelerate the progress of imidization. A solution containing the polyimide resin obtained by imidization of the polyamic acid is mixed with a poor solvent to precipitate the polyimide resin as a solid substance, and the polyimide resin is collected and dissolved in a solvent to be used for film formation, thereby obtaining a polyimide resin solution for producing a polyimide film. Once the polyimide resin is precipitated as a solid substance, impurities generated during polymerization of the polyamic acid, and the residual dehydration agent and the imidization catalyst and the like can be washed and removed, so that it is possible to prevent coloring of the polyimide and an increase in yellowness index. In addition, the method including precipitating the polyimide resin once is also preferable in that a solvent suitable for the conditions for forming the polyimide film can be applied.

[Phosphoric Acid Ester]

As described in detail later, a polyimide film containing a phosphoric ester tends to have smaller birefringence than that of a polyimide film free of a phosphoric ester. The phosphoric ester is an orthophosphoric ester represented by general formula (2) or a condensed phosphoric ester represented by general formula (3).

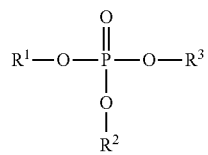

(2)

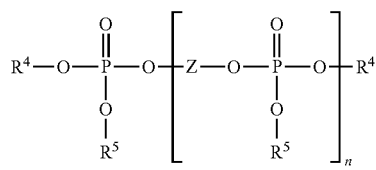

(3)

$R^1$ to $R^3$ in general formula (2) $R^4$ and $R^5$ in genera formula (3) are each independently any monovalent organic group, preferably an aryl group optionally having a substituent, a aliphatic group having 1 to 20 carbon atoms and optionally having a branch, or a poly(oxyalkylene)alkyl group.

Z in general formula (3) is any divalent organic group, and preferably contains at least one aromatic ring. n in general formula (3) is an integer of 1 or more. The condensed phosphoric ester of general formula (3) may be a mixture of compounds having different numbers of n.

The type of the phosphoric ester is not particularly limited as long as it is compatible with the polyimide. From the viewpoint of suppressing volatilization of the phosphoric ester by heating during production of the polyimide film, the boiling point of the phosphoric ester is preferably 200° C. or higher, more preferably 220° C. or higher, further preferably 250° C. or higher, particularly preferably 280° C. or higher.

From the viewpoint of reducing the volatility, the orthophosphoric ester of general formula (2) is preferably one in which at least one of substituents $R^1$ to $R^3$ is an aryl group optionally having a substituent, more preferably a fully aromatic phosphoric ester in which all of $R^1$ to $R^3$ are aryl group optionally having a substituent.

Specific examples of the fully aromatic orthophosphoric ester include triphenyl phosphate (TPP), tricresyl phosphate (TCP), trixylenyl phosphate (TXP), cresyl diphenyl phosphate (CDP), and cresyl 2,6-xylenyl phosphate (e.g., "PX-110" manufactured by DAIHACHI CHEMICAL INDUSTRY CO., LTD.).

From the viewpoint of reducing the volatility, the condensed phosphoric ester of general formula (3) is preferably one in which at least one of substituents $R^4$ and $R^5$ is an aryl group optionally has a substituent, more preferably one in which both $R^4$ and $R^5$ are aryl group optionally having a substituent.

Specific examples of the divalent substituent Z in general formula (3) include the following groups Z-1 to Z-6.

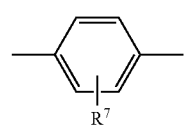

Z-1

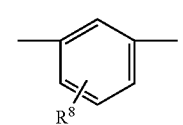

Z-2

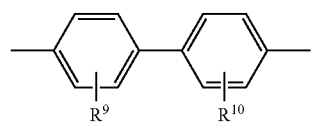

Z-3

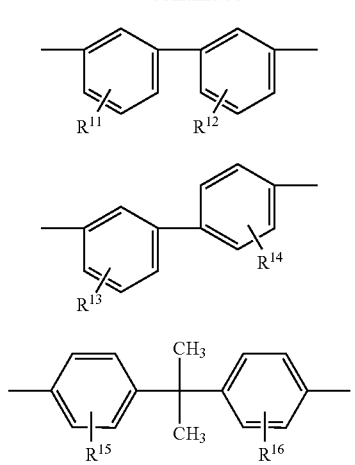

R$^7$ to R$^{16}$ in Z-1 to Z-6 are each independently a hydrogen atom or any substituent (monovalent organic group). In Z-1 to Z-6, two or more substituents may be bonded to one benzene ring. When each of R$^6$ to R$^{16}$ is a monovalent organic group, specific examples thereof include alkyl groups having 1 to 6 carbon atoms and optionally having a branch.

Specific examples of the fully aromatic condensed phosphoric ester include resorcinol bis(diphenyl phosphate) (e.g., "CR-733 S" manufactured by DAIACHI CHEMICAL INDUSTRY CO., LTD. and "ADK STAB PFR" manufactured by ADEKA CORPORATION), bisphenol A bis(diphenyl phosphate) (e.g., "CR-741" manufactured by DAIHACHI CHEMICAL INDUSTRY CO., LTD. and "ADK STAB FP-600" manufactured by ADEKA CORPORATION), and resorcinol bis(di-2,6-xylenyl phosphate) (e.g., "PX-200" manufactured by DAIHACHI CHEMICAL INDUSTRY CO., LTD.).

Examples of the phosphoric ester include, in addition to those described above, commercially available products of the phosphoric ester such as "DAIGUARD-1000", "DAIGUARD-580", "DAIGUARD-880", "DAIGUARD-850", and "DAIGUARD-540" manufactured by DAIHACHI CHEMICAL INDUSTRY CO., LTD., and "POLYSTEP" series and "STEPFAC" series manufactured by STEPAN Company.

[Polyimide Film]

As described above, examples of the method for producing a polyimide film is a method in which a polyamic acid solution is formed into a film shape and then imidized by heating to obtain a polyimide film; and a method in which an isolated polyimide resin is dissolved in an organic solvent for the polyimide resin to prepare a polyimide solution, the polyamic acid solution is applied onto a substrate, and the organic solvent is removed.

When a polyimide film containing a phosphoric ester is produced, the phosphoric ester may be added at any stage. For example, a phosphoric ester may be added to the solution during polymerization of the polyamic acid or imidization of the polyamic acid. In addition, when the isolated polyimide resin is dissolved in an organic solvent to prepare a polyimide solution, the phosphoric ester may be added. From the viewpoint of suppressing volatilization of the phosphoric ester and improving the transparency of the polyimide film, a method is preferable in which a polyimide resin and the phosphoric ester are dissolved in an organic solvent to prepare a polyimide solution, and the organic solvent is removed from the polyimide solution applied in the form of a film.

The organic solvent in which the polyimide resin (and the phosphoric ester) is dissolved is not particularly limited as long as the polyimide resin can be dissolved therein, and examples thereof include N,N-dimethylformamide, N,N-dimethylacetamide, N-methylpyrrolidone, methyl ethyl ketone, ethyl acetate, methyl acetate, cyclohexanone and dichloromethane. Among them, methyl ethyl ketone, dichloromethane and the like are preferable because the solvent is easily dried and removed, and the amount of the remaining solvent in the polyimide film can be reduced.

The amount of the phosphoric ester is preferably 3 parts by mass or more, more preferably 5 parts by mass or more based on 100 parts by mass of the polyimide. The birefringence of the polyimide film tends to decrease as the amount of the phosphoric ester increases. In general, an additive (retardation adjusting agent) used for reducing the birefringence of a resin film tends to also act as a plasticizer, and the mechanical strength such as the tensile elastic modulus of the film tends to decrease as the retardation is reduced. On the other hand, when a phosphoric ester is added to the polyimide resin, the phosphoric ester has a birefringence reducing action, but the tensile elastic modulus of the film hardly decreases, and rather an action opposite to that of a plasticizer may be exerted, leading to an increase in tensile elastic modulus. Thus, a transparent polyimide film containing a phosphoric ester has birefringence lower than that of a polyimide film free of a phosphoric ester, and can have a tensile elastic modulus equal to that of the polyimide film free of a phosphoric ester or higher than that of the polyimide film free of a phosphoric ester.

In addition, the yellowness index of the polyimide film tends to decrease and the light transmittance in a visible-light short-wavelength range (around 400 nm) tends to increase with the addition of a phosphoric ester, so that a polyimide film can be obtained which is less colored and has high transparency.

From the viewpoint of reduction of the birefringence and improvement of transparency (reduction of coloring) of the polyimide film, the larger the amount of the phosphoric ester, the more preferable. The amount of the phosphoric ester based on 100 parts by mass of the polyimide is preferably 10 parts by mass or more, more preferably 15 parts by mass or more, and may be 20 parts by mass or more, 25 parts by mass or more, or 30 parts by mass or more. The condensed phosphoric ester of general formula (3) tends to reduce the birefringence of the polyimide film even with a smaller amount as compared to the orthophosphoric ester of general formula (2).

The upper limit of the amount of the phosphoric ester is not particularly limited, but an excessively large amount of the phosphoric ester may cause cloudiness (increase in haze) of the film, reduction of mechanical strength, contamination due to bleed-out, etc., while the birefringence reducing effect associated with an increase in the amount of the phosphoric ester peaks out. The amount of the orthophosphoric ester of general formula (2) based on 100 parts by mass of the polyimide is preferably 200 parts by mass or less, more preferably 100 parts by mass or less, further preferably 80 parts by mass or less, and may be 70 parts by mass or less or 60 parts by mass or less. The amount of the condensed phosphoric ester of general formula (3) based on 100 parts by mass of the polyimide is preferably 99 parts by mass or less, more preferably 90 parts by mass or less, further preferably 80 parts by mass or less, and may be 70 parts by mass or less or 60 parts by mass or less.

The polyimide solution may contain additives (organic or inorganic low-molecular-weight or high-molecular-weight compounds) in addition to the polyimide and the phosphoric ester. Examples of the additives include ultraviolet absorbers, crosslinkers, dyes, surfactants, leveling agents, plasticizers, fine particles and sensitizers. The fine particles include organic fine particles such as those of polystyrene and polytetrafluoroethylene, and inorganic fine particles such as those of colloidal silica, carbon and layered silicate, and may have a porous or hollow structure.

As a method for applying the polyimide solution onto the substrate, a known method can be used, and the polyimide solution can be applied by, for example, a bar coater or a comma coater. As the substrate to which the polyimide solution is applied, a glass substrate, a metal substrate, a metal drum or a metal belt made of SUS or the like, a plastic film, or the like can be used. From the viewpoint of improving productivity, it is preferable to produce a film by a roll-to-roll process using an endless support such as a metal drum or a metal belt, a continuous length plastic film or the like as a substrate. When a plastic film is used as the substrate, a material that is not soluble in a deposition dope solvent may be appropriately selected, and as the plastic material, polyethylene terephthalate, polycarbonate, polyacrylate, polyethylene naphthalate or the like is used.

A polyimide solution is applied onto a substrate, and the solvent is removed by drying to obtain a transparent polyimide film. It is preferable to perform heating the solvent during drying. The heating temperature is not particularly limited as long as the solvent can be removed and coloring of the resulting transparent polyimide film can be suppressed, and the temperature is appropriately set to room temperature to about 250° C. The heating temperature may be elevated stepwise. In particular, the heating temperature is more preferably 50° C. to 220° C. When the temperature is in this range, coloring of the polyimide can be suppressed, and volatilization of the phosphoric ester can also be suppressed. After drying proceeds to some extent, the polyimide film may be peeled off from the support and dried for enhancing the solvent removal efficiency. For accelerating the removal of the solvent, heating may be performed under reduced pressure.

The thickness of the polyimide film is not particularly limited, and may be appropriately set according to a use purpose. The thickness of the polyimide film is, for example, 5 μm or more. The thickness of the polyimide film is preferably 20 μm to 100 μm, more preferably 30 μm to 90 μm, further preferably 40 μm to 80 μm, particularly preferably 50 m to 80 μm from the viewpoint of achieving both self-supporting properties and flexibility and obtaining a film having high transparency. The thickness of the transparent polyimide film which is used as a cover film for a display is preferably 50 μm or more.

In the polyimide film, the transmittance at a wavelength of 400 nm is preferably 45% or more, more preferably 50% or more, further preferably 55% or more. The yellowness index YI of the polyimide film is preferably 3.0 or less, more preferably 2.5 or less, and may be 2.2 or less or 2.0 or less. As described above, addition of the phosphoric ester tends to increase the transmittance at a wavelength of 400 nm and reduce the yellowness index. The haze of the polyimide film is preferably 1.5% or less, more preferably 1.2% or less, and may be 1.0% or less, 0.8% or less, or 0.7% or less.

The tensile elastic modulus (E) of the polyimide film is preferably 3.0 GPa or more, more preferably 3.5 GPa or more, further preferably 4.0 GPa or more, and may be 4.5 Ga or more or 5.0 GPa or more. A film having a high tensile elastic modulus tends to have a high scratch hardness in JIS K 5600, and can be suitably used for a member disposed on an outermost surface like a cover film over a display layer. The upper limit of the tensile elastic modulus E is not particularly limited, and is generally 10 GPa or less.

The thickness-direction birefringence ($\Delta n$) of the polyimide film is preferably 0.050 or less, and may be 0.040 or less, 0.030 or less, or 0.020 or less. From the viewpoint of suppressing deterioration of visibility by rainbow-like unevenness, a shift in color tone and the like at the time of viewing in an oblique direction, the thickness-direction birefringence ($\Delta n$) is preferably as small as possible. The thickness-direction birefringence is a value defined by $\Delta n = (Nx+Ny)/2-Nz$. Nx is a refractive index in a slow axis direction in the film plane, Ny is a refractive index in a fast axis direction in the film plane, and Nz is a refractive index in a thickness direction.

As described above, addition of a phosphoric ester enables reduction of birefringence while causing little change in tensile elastic modulus (E) (or increasing the tensile elastic modulus (E)). In addition, when a specific phosphoric ester such as a condensed phosphoric ester is used, the birefringence reducing effect tends to increase.

The birefringence reducing effect from addition of a phosphoric ester in a polyimide film can be assessed by preparing a polyimide film free of a phosphoric ester (film of polyimide alone) using the same polyimide, and evaluation can be made based on the ratio $\Delta n/\Delta n'$ between the thickness-direction birefringence ($\Delta n$) of a polyimide film containing a phosphoric ester and the thickness-direction birefringence ($\Delta n'$) of a polyimide film of polyimide alone, which is free of an acid ester. The smaller the ratio $\Delta n/\Delta n'$, the greater the birefringence reducing effect. The ratio $\Delta n/\Delta n'$ is preferably less than 0.90, more preferably less than 0.80, further preferably less than 0.70, and may be less than 0.60, less than 0.50, or less than 0.40. The ratio $\Delta n/\Delta n'$ is preferably as small as possible, but is generally 0.01 or more.

Suppression of a decrease in elastic modulus by addition of a phosphoric ester can be assessed on the basis of the ratio E/E' between the tensile elastic modulus € of a polyimide film containing a phosphoric ester and the tensile elastic modulus (E') of a film of polyimide alone, which is free of a phosphoric ester. The ratio E/E' being closer to 1 means that a decrease in tensile elastic modulus is more suppressed, and when the ratio E/E' is larger than 1, the phosphoric ester exerts an action opposite to that of a plasticizer. In the polyimide film, it is preferable that the ratio $\Delta n/\Delta n'$ is in the above-described range and the ratio E/E' is 0.8 or more. The ratio E/E' is more preferably 0.85 or more, further preferably 0.90 or more, particularly preferably 0.95 or more. The ratio E/E' may be 1 or more, or may be more than 1. The ratio E/E' is preferably as large as possible, but is generally 1.2 or less.

As described above, even when the phosphoric ester is added to the polyimide at a high concentration, a high ratio E/E' is maintained, and therefore a polyimide film having a high tensile elastic modulus (E) and small thickness-direction birefringence ($\Delta n$) can be obtained. At the same addition amount, the condensed phosphoric ester of general formula (3) tends to have a birefringence reducing effect higher than that of the orthophosphoric ester of general formula (2). In an embodiment of the present invention, a polyimide film having a large tensile elastic modulus ratio E/E' and a small thickness-direction birefringence ratio $\Delta n/\Delta n'$ can be obtained by adjusting the addition amount of a phosphoric ester according to the type of the phosphoric ester.

As described above, addition of a phosphoric ester tends to reduce the birefringence and improve the transparency (reduce coloring) of the polyimide film. The transparency improving effect from addition of a phosphoric ester can be assessed by the ratio T/T' between the transmittance (T) at a wavelength of 400 nm in a polyimide film containing the phosphoric ester and the transmittance (T') at a wavelength of 400 nm in a film of a polyimide alone, which is free of a phosphoric ester. The larger the ratio T/T', the higher the transparency improving effect. The ratio T/T' is preferably more than 1, more preferably 1.05 or more, further preferably 1.10 or more, and may be 1.15 or more, 1.20 or more, or 1.25 or more. The ratio T/T' tends to increase as the addition amount of the phosphoric ester increases. However, when the addition amount of the phosphoric ester is excessively large, the haze may increase.

The transparency improving effect can also be assessed by the ratio (YI/YI') between the yellowness index (YI) of a polyimide film containing a phosphoric ester and the yellowness index (YI') of a film of a polyimide alone, which is free from a phosphoric ester. The smaller the ratio YI/YI', the higher the transparency improving effect. The ratio YI/YI' is preferably less than 1, more preferably 0.95 or less, further preferably 0.90 or less, and may be 0.85 or less, 0.80 or less, 0.75 or less, or 0.70 or less.

[Uses of Polyimide Film]

The transparent polyimide film according to an embodiment of the present invention has high transparency and small birefringence, and is therefore suitably used as a display material. In particular, a polyimide film having high mechanical strength is applicable to surface members of cover films of displays, etc. In practical use, a surface of the transparent polyimide film may be provided with an antistatic layer, an easily bondable layer, a hard coat layer, an antireflection layer and the like.

EXAMPLES

Hereinafter, the present invention will be described in more detail on the basis of polyimide film production examples. The present invention is not limited to the following specific examples.

Organic solvents and compounds are described as the following abbreviations.

TFMB: 2,2'-bis(trifluoromethyl)benzidine
3,3'-DDS: 3,3'-diaminodiphenylsulfone
CBDA: 1,2,3,4-cyclobutanetetracarboxylic acid dianhydride
6FDA: 2,2-bis(3,4-dicarboxyphenyl)-1,1,1,3,3,3-hexafluoropropane dianhydride
BPDA: 3,3',4,4'-biphenyltetracarboxylic acid dianhydride
TMHQ: bis(1,3-dioxo-1,3-dihydroisobenzofuran-5-carboxylic acid)1,4-phenylene
TAHMBP: bis(1,3-dioxo-1,3-dihydroisobenzofuran-5-carboxylic acid)2,2',3,3',5,5'-hexamethylbiphenyl-4,4'-diyl Production Example 1 to 3: Production of Polyimide Resin <Preparation of Polyamic Acid Solution>

DMF was added into a separable flask, and stirred in a nitrogen atmosphere. To this was added a diamine and an acid dianhydride at a ratio as shown in Table 1, and the mixture was reacted by stirring in a nitrogen atmosphere for 5 to 10 hours to obtain a polyamic acid solution having a solid content concentration of 18%.

TABLE 1

| | Diamine (mol %) | | Acid dianhydride (mol %) | | | | |
|---|---|---|---|---|---|---|---|
| | TFMB | 3,3'-DDS | 6FDA | BPDA | CBDA | TMHQ | TAHMBP |
| Production Example 1 | 70 | 30 | 50 | 25 | — | 25 | — |
| Production Example 2 | 90 | 10 | 20 | 15 | 15 | — | 50 |
| Production Example 3 | 100 | — | 100 | — | — | — | — |

<Imidization and Separation of Polyimide Resin>

5.5 g of pyridine as an imidization catalyst were added to the above-described polyamic acid solution and completely dispersed, 8 g of acetic anhydride was then added, and the mixture was stirred at 90° C. for 3 hours. While the solution cooled to room temperature was stirred, 100 g of 2-propyl alcohol (hereinafter, referred to as "IPA") was added dropwise at a rate of 2 to 3 drops/sec to precipitate a polyimide. Further, 150 g of IPA was added, and the mixture was stirred for about 30 minutes, and performed with a Kiriyama funnel. The obtained solid was washed with 100 g of IPA. The washing operation was repeated 6 times, the solid was then dried in a vacuum oven set at 120° C. for 12 hours to obtain a polyimide resins 1 to 3.

Reference Examples 1 to 3: Production of Polyimide Film Free of Phosphoric Ester Reference Example 1

The polyimide resin 1 was dissolved in methylene chloride to prepare a polyimide solution having a solid content concentration of 11%. The polyimide solution was applied to an alkali-free glass plate, and heated in an air atmosphere at 40° C. for 60 minutes, 70° C. for 30 minutes, 150° C. for 30 minutes and 170° C. for 30 minutes to remove the solvent, thereby obtaining a polyimide film having a thickness as shown in Table 2. The thickness of the film was measured using a length gauge ("ND-CT 2501" manufactured by Heidenhain GmbH).

Reference Examples 2 and 3

Except that polyimide resins 2 and 3 were used instead of the polyimide resin 1, the same procedure as in Reference Example 1 was carried out to prepare polyimide films.

[Production of Polyimide Film Containing Phosphoric Ester]

In the preparation of the polyimide solution, phosphoric esters, the types and amounts of which are shown in Table 2, were added to 100 parts by mass of the polyimide resin. Except for the above, in the same manner as in Reference Example 1 for polyimide films 1A to 1L, as in Reference Example 2 for polyimide films 2A to 2N and as in Reference Example 3 for the polyimide film 3A, a polyimide solution was applied onto an alkali-free glass plate, and the solvent was removed to prepare films. Details of phosphoric esters 1 to 8 are as follows.

Phosphoric acid ester 1: triphenyl phosphate (manufactured by Tokyo Chemical Industry Co., Ltd.)

Phosphoric acid ester 2: non-halogen-based orthophosphoric ester ("DAIGUARD-1000" manufactured by DAIHACHI CHEMICAL INDUSTRY CO., LTD.)

Phosphoric acid ester 3: resorcinol bis(diphenyl phosphate) ("CR-733 S" manufactured by DAIHACHI CHEMICAL INDUSTRY CO., LTD.)

Phosphoric acid ester 4: bisphenol A bis(diphenyl phosphate) ("CR-741" manufactured by DAIHACHI CHEMICAL INDUSTRY CO., LTD.)

Phosphoric acid ester 5: tricresyl phosphate (manufactured by Tokyo Chemical Industry Co., Ltd.)

Phosphoric acid ester 6: tris(2-ethylhexyl) phosphoric acid (manufactured by Tokyo Chemical Industry Co., Ltd.)

Phosphoric acid ester 7: cresyldiphenyl phosphate (manufactured by Tokyo Chemical Industry Co., Ltd.)

Phosphoric acid ester 8: Resorcinol bis(di-2,6-xylenyl phosphate) ("PX-200" manufactured by DAIHACHI CHEMICAL INDUSTRY CO., LTD.)

[Evaluation of Polyimide Film]

<Thickness-Direction Birefringence ($\Delta n$)>

The polyimide film was cut into a 3 cm square, and the thickness retardation Rth and the in-plane retardation Re at a wavelength of 590 nm were measured with an average refractive index of 1.60 using an automatic birefringence meter "KOBRA" manufactured by Oji Scientific Instruments. From the three-dimensional refractive index (Refractive indices Nx and Ny in an in-plane direction and refractive index Nz in a thickness direction) calculated from the measured value, the thickness-direction birefringence $\Delta n = (Nx+Ny)/2-Nz$ was calculated.

(Tensile Elastic Modulus)

"AUTOGRAPH AGS-X" manufactured by Shimadzu Corporation was used, and the measurement was performed under the following conditions. Sample measurement range; width: 10 mm, distance between grippers: 100 mm, tensile speed: 20.0 mm/min, and measurement temperature: 23° C. As a sample, one left standing at 23° C./55% RH for 1 day to control the humidity was used.

<Yellowness Index (YI)>

Measurement was performed with a spectrophotometer "SC-P" manufactured by Suga Test Instruments Co., Ltd. using a sample of 3 cm square.

<Transmittance at 400 nm>

With the use of an ultraviolet-visible spectrophotometer "V-560" manufactured by JASCO Corporation, the light transmittance of the film at 300 to 800 nm was measured, and the light transmittance at a wavelength of 400 nm was read.

<Haze>

Measurement was performed by the method described in JIS K7136 using a haze meter "HZ-V3" manufactured by Suga Test Instruments Co., Ltd.

Table 2 shows the composition of the polyimide film (type of polyimide resin, type and content of phosphoric ester) and the results of evaluation of the polyimide film. The elastic modulus ratio E/E' in Table 2 is the ratio between the tensile elastic modulus E of a polyimide film containing a phosphoric ester and the tensile elastic modulus E' of the polyimide film free of a phosphoric ester in Reference Example. Similarly, the birefringence ratio, the YI ratio and the transmittance ratio are the ratios of the thickness-direction birefringence $\Delta n$, the yellowness index YI and the transmittance at a wavelength of 400 nm, respectively, to those in Reference Examples. In the film 1J, significant cloudiness was observed, and therefore only the thickness was evaluated.

TABLE 2

| | Composition | | | Results of evaluation of polyimide film | | | | | | | | |
|---|---|---|---|---|---|---|---|---|---|---|---|---|
| | | Phosphoric acid ester | | Thickness (μm) | Tensile elastic modulus (GPa) | $\Delta n$ | YI | Transmittance at 400 nm (%) | Haze (%) | Elastic modulus ratio | Birefringence ratio | YI ratio | Transmittance ratio |
| | Polyimide | Type | Added amount (parts by mass) | | | | | | | | | | |
| Reference Example 1 | 1 | — | | 46.1 | 4.15 | 0.0550 | 2.10 | 51.0 | 0.50 | — | — | — | — |
| 1A | 1 | 1 | 10 | 51.0 | 4.23 | 0.0435 | 1.84 | 58.5 | 0.66 | 1.02 | 0.79 | 0.88 | 1.15 |
| 1B | 1 | 1 | 20 | 61.1 | 3.93 | 0.0266 | 1.74 | 58.0 | 0.55 | 0.95 | 0.48 | 0.83 | 1.14 |
| 1C | 1 | 1 | 40 | 52.2 | 3.85 | 0.0297 | 1.55 | 67.0 | 0.44 | 0.93 | 0.54 | 0.74 | 1.31 |
| 1D | 1 | 1 | 60 | 40.0 | 3.85 | 0.0258 | 1.44 | 68.2 | 0.54 | 0.93 | 0.47 | 0.69 | 1.34 |
| 1E | 1 | 1 | 100 | 50.0 | 3.84 | 0.0155 | 1.40 | 74.4 | 0.50 | 0.93 | 0.28 | 0.67 | 1.46 |
| 1F | 1 | 2 | 40 | 51.0 | 4.23 | 0.0194 | 2.16 | 65.6 | 0.77 | 1.02 | 0.35 | 1.03 | 1.29 |
| 1G | 1 | 3 | 20 | 51.0 | 4.38 | 0.0259 | 1.80 | 63.8 | 0.40 | 1.06 | 0.47 | 0.86 | 1.25 |
| 1H | 1 | 3 | 40 | 64.1 | 4.29 | 0.0094 | 1.73 | 62.9 | 1.11 | 1.03 | 0.17 | 0.82 | 1.23 |
| 1I | 1 | 3 | 100 | 50.0 | | | | N.D. | | | | | |
| 1K | 1 | 4 | 40 | 58.1 | 4.02 | 0.0040 | 1.52 | 65.5 | 0.36 | 0.97 | 0.07 | 0.72 | 1.29 |
| 1L | 1 | 4 | 100 | 50.0 | 1.84 | 0.0013 | 1.25 | 77.1 | 0.47 | 0.44 | 0.02 | 0.60 | 1.51 |
| Reference Example 2 | 2 | — | | 51.0 | 5.00 | 0.0657 | 2.60 | 50.6 | 0.54 | — | — | — | — |
| 2A | 2 | 1 | 11 | 42.7 | 5.46 | 0.0556 | 1.95 | 60.8 | 0.77 | 1.09 | 0.85 | 0.75 | 1.20 |
| 2B | 2 | 1 | 40 | 35.2 | 5.12 | 0.0554 | 1.50 | 68.4 | 0.39 | 1.02 | 0.84 | 0.58 | 1.35 |
| 2C | 2 | 2 | 10 | 55.6 | 5.46 | 0.0575 | 2.51 | 53.8 | 0.63 | 1.09 | 0.88 | 0.97 | 1.06 |
| 2D | 2 | 3 | 1 | 51.0 | 5.13 | 0.0644 | 2.55 | 52.3 | 0.45 | 1.03 | 0.98 | 0.98 | 1.03 |
| 2E | 2 | 3 | 3 | 51.2 | 5.15 | 0.0611 | 2.51 | 55.4 | 0.41 | 1.03 | 0.93 | 0.97 | 1.09 |
| 2F | 2 | 3 | 5 | 50.5 | 5.23 | 0.0585 | 2.32 | 59.0 | 0.43 | 1.05 | 0.89 | 0.89 | 1.17 |
| 2G | 2 | 3 | 11 | 28.6 | 5.46 | 0.0555 | 1.72 | 68.4 | 0.66 | 1.09 | 0.85 | 0.66 | 1.35 |

TABLE 2-continued

| | Composition | | | Results of evaluation of polyimide film | | | | | | | | |
|---|---|---|---|---|---|---|---|---|---|---|---|---|
| | | Phosphoric acid ester | | Thick- | Tensile elastic | | | | | | | Trans- |
| | Poly-imide | Type | Added amount (parts by mass) | ness (μm) | modulus (GPa) | Δn | YI | Transmittance at 400 nm (%) | Haze (%) | Elastic modulus ratio | Birefringence ratio | YI ratio | mittance ratio |
| 2H | 2 | 3 | 40 | 48.9 | 5.03 | 0.0160 | 1.72 | 66.9 | 0.39 | 1.01 | 0.24 | 0.66 | 1.32 |
| 2I | 2 | 4 | 40 | 48.6 | 4.95 | 0.0116 | 1.79 | 67.7 | 0.77 | 0.99 | 0.18 | 0.69 | 1.34 |
| 2J | 2 | 5 | 11 | 53.6 | 5.25 | 0.0539 | 2.07 | 67.5 | 0.83 | 1.05 | 0.82 | 0.80 | 1.33 |
| 2K | 2 | 6 | 11 | 50.4 | 4.40 | 0.0532 | 2.89 | 68.9 | 0.34 | 0.88 | 0.81 | 1.11 | 1.36 |
| 2L | 2 | 7 | 11 | 48.8 | 5.21 | 0.0545 | 2.14 | 67.8 | 0.47 | 1.04 | 0.83 | 0.82 | 1.34 |
| 2M | 2 | 8 | 3 | 50.4 | 5.19 | 0.0618 | 2.44 | 55.6 | 0.45 | 1.04 | 0.94 | 0.94 | 1.10 |
| 2N | 2 | 8 | 11 | 50.1 | 5.06 | 0.0539 | 2.11 | 62.8 | 0.85 | 1.01 | 0.82 | 0.81 | 1.24 |
| Reference Example 3 | 3 | — | | 47.5 | 3.63 | 0.0406 | 1.65 | 77.4 | 0.63 | — | — | — | — |
| 3A | 3 | 3 | 11 | 48.8 | 3.81 | 0.0264 | 1.58 | 78.8 | 0.55 | 1.05 | 0.65 | 0.96 | 1.02 |

In the films 1A to 1L produced using the polyimide resin 1, except for the film 1J, the haze did not significantly increase, the birefringence of the film was lower than that in Reference Example 1, and the birefringence tended to decrease as the addition amount of the phosphoric ester increased. Comparison of the films 1C, 1F, 1H and 1K to which 40 parts by mass of phosphoric ester was added shows that in the films 1H and 1K obtained using a condensed phosphoric ester, the birefringence reducing effect from addition of the phosphoric ester is more remarkable.

In the film 1L, the tensile elastic modulus was as low as a half of that in Reference Example 1. It is apparent that in the films 1A to 1H and 1K, birefringence is reduced while the tensile elastic modulus is maintained owing to the addition of the phosphoric ester. In particular, in the films 1A, 1F, 1G and 1H, the elastic modulus ratio was more than 1, and the phosphoric ester tended to exert an action opposite to that of a plasticizer. In addition, with the addition of the phosphoric ester, the transmittance at a wavelength of 400 nm tended to increase, leading to a decrease in yellowness index.

The films 2A to 2N produced using the polyimide resin 2 and the film 3A produced using the polyimide resin 3 also showed the same tendency as described above, and the film 2K produced using the phosphoric ester 6 had yellowness index larger than that in Reference Example 2, and an elastic modulus lower as compared other examples. From these results, it is considered that an aromatic phosphoric ester is suitable for obtaining a polyimide film having high mechanical strength and transparency and low birefringence.

In the films 2D to 2H, birefringence tended to decrease as the addition amount of the phosphoric ester increased, and in the films 2D and 2E, the birefringence ratio was more than 0.9, and the birefringence reducing effect was not sufficient. The same applies to the film 2M in which the addition amount of the phosphoric ester is 3 parts by mass.

The above results show that by incorporating a phosphoric ester, high transparency and low birefringence can be achieved while the elastic modulus of the polyimide film is maintained or improved, and by adjusting the type and the addition amount of the phosphoric ester, a transparent polyimide film having excellent mechanical strength and extremely small birefringence can be obtained.

The invention claimed is:
1. A transparent polyimide film, comprising:
a polyimide; and
a phosphoric ester,
wherein a content of the phosphoric ester is 3 to 100 parts by mass based on 100 parts by mass of the polyimide, the polyimide contains a repeating unit represented by the following general formula (1):

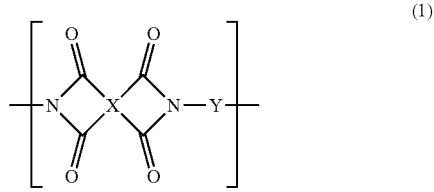

(1)

wherein in the general formula (1), X is a tetravalent organic group containing at least one selected from the group consisting of a fluoroalkyl group, an ether bond, a thioether bond, an ester bond, a sulfone group, an alicyclic structure and a linear aliphatic group having 2 or more carbon atoms, and Y is a divalent organic group containing at least one selected from the group consisting of a fluoroalkyl group, a sulfone group, a fluorene structure and an alicyclic structure,
wherein the transparent polyimide film has:
a thickness of 5 μm to 100 μm,
a haze of 1.5% or less,
a yellowness index of 3.0 or less, and
a tensile elastic modulus E of 3.0 GPa or more.
2. The transparent polyimide film according to claim 1, wherein
a ratio of a tensile elastic modulus (E) of the transparent polyimide film to a tensile elastic modulus (E') of a polyimide film, which comprises the polyimide and is free of the phosphoric ester, is 0.80 or more, and
wherein a ratio of a thickness-direction birefringence (Δn) of the transparent polyimide film to a thickness-direction birefringence (Δn') of the polyimide film, which comprises the polyimide and is free of the phosphoric ester, is less than 0.90.
3. The transparent polyimide film according to claim 1, wherein the content of the phosphoric ester is 5 to 100 parts by mass based on 100 parts by mass of the polyimide.
4. The transparent polyimide film according to claim 2, wherein the ratio E/E' is 0.95 or more.
5. The transparent polyimide film according to claim 1, wherein the content of the phosphoric ester is 15 to 100 parts by mass based on 100 parts by mass of the polyimide.
6. The transparent polyimide film according to claim 1, wherein the phosphoric ester is one selected from an orthophosphoric ester represented by the following general formula (2) and a condensed phosphoric ester represented by the following general formula (3):

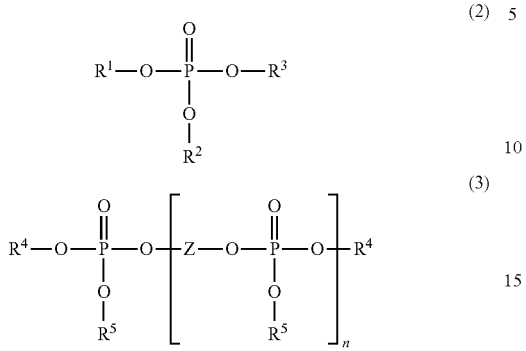

(2)

(3)

wherein in the general formula (2), $R^1$ to $R^3$ are each independently an aryl group optionally having a substituent, wherein in the general formula (3), n is an integer of 1 or more, $R^4$ and $R^5$ are each independently an aryl group optionally having a substituent, and Z is a divalent organic group containing at least one aromatic ring.

7. The transparent polyimide film according to claim 6, wherein the phosphoric ester is a condensed phosphoric ester represented by the general formula (3), wherein the organic group Z is selected from the following groups Z-1 to Z-6:

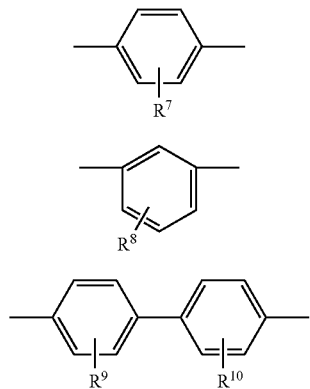

Z-1

Z-2

Z-3

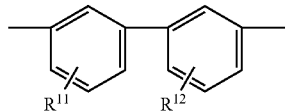

Z-4

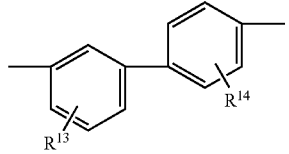

Z-5

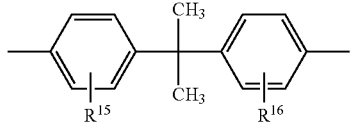

Z-6 wherein $R^7$ to $R^{16}$ are each independently a hydrogen atom or an alkyl group having 1 to 6 carbon atoms and optionally having a branch, and wherein two or more $R^7$ to $R^{16}$ are optionally bonded to each benzene ring of Z-1 to Z-6.

8. The transparent polyimide film according to claim 1, wherein the phosphoric ester is at least one selected from the group consisting of triphenyl phosphate, tricresyl phosphate, cresyldiphenyl phosphate, resorcinol bis(diphenyl phosphate), bisphenol A bis(diphenyl phosphate) and resorcinol bis(di-2,6-xylenyl phosphate).

9. The transparent polyimide film according to claim 1, having a thickness-direction birefringence (Δn) of 0.050 or less.

10. A method for producing the transparent polyimide film according to claim 1, comprising:
dissolving a solvent-soluble polyimide resin and the phosphoric ester in an organic solvent to prepare a polyimide solution, wherein the organic solvent exhibits solubility with respect to the polyimide resin;
applying the polyimide solution onto a substrate; and
removing the organic solvent from the polyimide solution to form the transparent polyimide film.

* * * * *